(12) United States Patent
Hsu

(10) Patent No.: US 6,492,450 B1
(45) Date of Patent: Dec. 10, 2002

(54) USE OF POLYMERS IN GYPSUM WALLBOARD

(75) Inventor: Oscar Hsien-Hsiang Hsu, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/506,006

(22) Filed: Feb. 17, 2000

Related U.S. Application Data

(60) Provisional application No. 60/123,105, filed on Mar. 5, 1999.

(51) Int. Cl.[7] ................................................. C08K 3/30
(52) U.S. Cl. ....................................................... 524/423
(58) Field of Search ......................................... 524/423

(56) References Cited

U.S. PATENT DOCUMENTS

| 4,341,560 A | 7/1982 | Saito et al. |
| 5,093,410 A | 3/1992 | Kambayashi et al. |
| 5,397,631 A | 3/1995 | Green et al. |
| 5,521,266 A | 5/1996 | Lau |
| 5,702,828 A | 12/1997 | Adler et al. |

FOREIGN PATENT DOCUMENTS

| WO | WO 98/30515 | 7/1998 |
| WO | WO 99-47470 | 9/1999 |

*Primary Examiner*—Edward J. Cain
(74) *Attorney, Agent, or Firm*—Gary D. Greenblatt

(57) ABSTRACT

A composition useful as gypsum wallboard and a method for protecting gypsum wallboard against water are disclosed. The composition and the method utilize a polymer containing a hydrophobically modified monomer to provide water resistance.

14 Claims, No Drawings

USE OF POLYMERS IN GYPSUM WALLBOARD

This is a nonprovisional application of prior pending provisional application Ser. No. 60/123,105 filed Mar. 5, 1999

This invention relates to the use of polymers in gypsum wallboard. The polymers contain hydrophobically modified monomers as polymerized units and are prepared by emulsion polymerization.

Gypsum wallboard is a material which is commonly used in buildings for walls and ceilings. It is usually a flat board of gypsum material which is lined on both external surfaces with paper.

Gypsum wallboard typically contains calcium sulfate hemihydrate as a major ingredient, and so is very hydrophilic. When placed on gypsum, a drop of water will be absorbed almost immediately. This may lead to problems in that the gypsum may become weakened or the water may cause stains in the walls or ceilings.

Gypsum wallboard may be utilized in places where it is exposed to high moisture levels, such as areas with humid climates. Exposure to water is common in rooms such as bathrooms or kitchens, where steam from showers may build up in the room or water from the sink may splash onto the wall. Alternatively, gypsum wallboard may be exposed to water through leaks in roofs or pipes. Due to the problems associated with water, there is a need for a water resistant gypsum wallboard.

One approach to solving this problem has been to treat the paper liner with a latex of resin solids mixed with water. This approach has been demonstrated in U.S. Pat. No. 5,397,631. Gypsum wallboard which has paper liner treated in this manner can usually be easily identified, as the paper liners tend to be blue or green to indicate that they have been treated. Even though this approach provides some protection against water, water is able to slowly penetrate the treated paper liner and get into the gypsum. Waxes have been used to provide some water resistance to gypsum by admixing the wax with the gypsum, but polymers have not been taught to be useful in this manner.

When polymers have been admixed with gypsum, the purpose has been to increase the strength of the gypsum. WO 98/30515 discloses the use of polymers of lower alkyl acrylate esters, such as butyl acrylate and methyl methacrylate as additives for gypsum to improve the strength of gypsum board. Although the polymers utilized improve the strength of the gypsum wallboard, they do not provide water resistance.

Therefore, there is a continuing need for a water resistant gypsum wallboard. It would also be useful if the treament which provides water resistance does not weaken the gypsum wallboard.

I have found that this need can be met by treating the gypsum with a polymer, which contains as polymerized units a hydrophobically modified monomer. By hydrophobically modified monomer is meant a $C_{12}$ to $C_{40}$ alkyl ester of (meth)acrylic acid.

The present invention provides a composition including from 80 to 99.5 parts by weight calcium sulfate, and from 0.5 to 20 parts by weight of a polymer including as polymerized units: a) from 1 to 100 parts by weight of at least one $C_{12}$ to $C_{40}$ alkyl ester of (meth)acrylic acid, b) from 0 to 99 parts by weight of at least one ethylenically unsaturated monomer, and c) from 0 to 15 parts by weight of at least one ethylenically unsaturated acid containing monomer or salts thereof.

In a second aspect, the present invention provides a method of protecting gypsum wallboard including: 1) admixing from 0.5 to 20 parts by weight of a polymer with from 80 to 99.5 parts by weight calcium sulfate and water; 2) molding the admixture to form a gypsum wallboard; and 3) drying the gypsum wallboard; wherein the polymer includes as polymerized units: a) from 1 to 100 parts by weight of at least one $C_{12}$ to $C_{40}$ alkyl ester of (meth)acrylic acid, b) from 0 to 99 parts by weight of at least one ethylenically unsaturated monomer, and c) from 0 to 15 parts by weight of at least one ethylenically unsaturated acid containing monomer or salts thereof.

The polymer used in this invention may be prepared by a single stage or multi-stage process. The process for making the polymer may be solution polymerization or emulsion polymerization utilizing methyl-β-cyclodextrin ("CD"). See U.S. Pat. No. 5,521,266 for a detailed description of the emulsion polymerization process. The emulsion polymerization process utilizing CD is preferred.

The morphology of the polymer utilized in this invention may be designed to optimize certain properties of the polymer. For example, the polymer may be made in a core-shell morphology wherein the core polymer is designed to have a lower glass transition temperature than the polymer that creates the shell. Alternatively, the polymer that makes up the core may be designed to have a higher glass transition temperature than the polymer that makes up the shell. In this case, the core may act as a filler and the shell may bind the harder cores together to aid in film formation. The core-shell polymers may be prepared by methods well known in the art.

In the process utilized for preparing the samples within this application, a first stage was prepared by adding a monomer emulsion and sodium persulfate to a solution containing CD, deionized water, and surfactant. The first stage was reacted at 85° C. A second stage was prepared by making a second monomer emulsion and feeding the second monomer emulsion and a sodium persulfate solution to the reacted first stage. The second stage was reacted at 85° C.

The polymer used in this invention contains as polymerized units from 1 to 100 parts by weight, preferably from 20 to 95 parts by weight, more preferably 40 to 95 parts by weight of at least one $C_{12}$ to $C_{40}$ alkyl ester of (meth)acrylic acid. It is further preferred that the polymer used in this invention contains as polymerized units from 60 to 95 parts by weight, preferably 70 to 94 parts by weight, more preferably 80 to 93 parts by weight of at least one $C_{12}$ to $C_{40}$ alkyl ester of (meth)acrylic acid. It is preferred that the alkyl ester of (meth)acrylic acid be a $C_{12}$ to $C_{30}$ alkyl ester of (meth)acrylic acid. It is more preferred that the alkyl ester of (meth)acrylic acid be a $C_{12}$ to $C_{18}$ alkyl ester of (meth)acrylic acid. Suitable alkyl esters of (meth)acrylic acid include, but are not limited to lauryl (meth)acrylate, cetyl (meth)acrylate, stearyl (meth)acrylate, behenyl (meth)acrylate, and eicosyl (meth)acrylate. Beneficial properties may be obtained by utilizing more than one $C_{12}$ to $C_{40}$ alkyl ester of (meth)acrylic acid.

The polymer used in this invention may also contain as polymerized units from 0 to 99 parts by weight, preferably 4 to 79 parts by weight, more preferably 4 to 59 parts by weight of at least one ethylenically unsaturated monomer. It is further preferred that the polymer used in this invention contains as polymerized units from 4 to 39 parts by weight, preferably 5 to 29 parts by weight, more preferably 6 to 19 parts by weight of at least one ethylenically unsaturated monomer. Suitable ethylenically unsaturated monomers for use in the preparation of the polymer compositions of this invention include, but are not limited to (meth)acrylic ester monomers including methyl acrylate, ethyl acrylate, butyl acrylate, 2-ethylhexyl acrylate, decyl acrylate, methyl methacrylate, butyl methacrylate, hydroxyethyl methacrylate, and hydroxypropyl acrylate; acrylamide or substituted acrylamides; styrene or substituted styrene; vinyl acetate or other vinyl esters; vinyl monomers such as vinyl chloride, vinylidene chloride, N-vinyl pyrolidone; and acrylonitrile or methacrylonitrile. Butyl acrylate, methyl methacrylate, and styrene are preferred.

The polymer used in this invention may also contain as polymerized units from 0 to 15 parts by weight, preferably 1 to 10 parts by weight, more preferably 1 to 5 parts by weight ethylenically unsaturated acid containing monomer or salts thereof. Suitable ethylenically unsaturated acid containing monomers include, but are not limited to acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride. Acrylic acid and methacrylic acid are preferred. Methacrylic acid is more preferred.

The polymer used in this invention may also contain as polymerized units from 0 to 25 parts by weight, preferably 0 to 15 parts by weight, more preferably 0 to 10 parts by weight of a fluorinated (meth)acrylate ethylenically unsaturated monomer, such as Zonyl™ products (Trademark of DuPont Chemical Company).

The polymer used in this invention may also contain as polymerized units from 0 to 25 parts by weight, preferably 0 to 15 parts by weight, more preferably 0 to 10 parts by weight of a silicone containing ethylenically unsaturated monomer, such as vinyl trimethoxy silane and methacryloxy propyl trimethoxy silane.

The polymer used in this invention may also contain as polymerized units from 0 to 80 parts by weight, preferably 0 to 50 parts by weight, more preferably 1 to 15 parts by weight of a monomer selected from $C_6$–$C_{20}$ alkyl styrene and alkyl-alpha-methyl styrene, $C_6$–$C_{20}$ alkyl dialkyl itaconate, $C_{10}$–$C_{20}$ vinyl esters of carboxylic acids, $C_8$–$C_{20}$ N-alkyl acrylamide and methacrylamide, $C_{10}$–$C_{20}$ alkyl alpha-hydroxymethylacrylate, $C_8$–$C_{20}$ dialkyl 2,2'-(oxydimethylene) diacrylate, $C_8$–$C_{20}$ dialkyl 2,2'-(alkyliminodimethylene)diacrylate, $C_8$–$C_{20}$ N-alkylacrylimide, and $C_{10}$–$C_{20}$ alkyl vinylether.

The polymer used in this invention may also contain as polymerized units from 0.1 to 10 parts by weight, preferably 0.1 to 5 parts by weight, more preferably 0.1 to 3 parts by weight, based on the polymer weight of a cross-linker selected from a cross-linking agent and a cross-linking monomer. By cross-linker is meant a compound which has at least 2 reactive groups which will react with acid groups found on the monomers of the compositions of this invention. Cross-linking agents useful in this invention include a polyaziridine, polyisocyanate, polycarbodiimide, polyamine, and a polyvalent metal. The cross-linking agent is optional, and may be added after polymerization has been completed.

Cross-linking monomers are cross-linkers which are incorporated with the monomers of the compositions of this invention during polymerization. Cross-linking monomers useful in this invention include acetoacetate-functional monomers such as acetoacetoxyethyl acrylate, acetoacetoxypropyl methacrylate, acetoacetoxyethyl methacrylate, allyl acetoacetate, acetoacetoxybutyl methacrylate, and 2,3-di (acetoacetoxy)propyl methacrylate; divinyl benzene, (meth) acryloyl polyesters of polyhydroxylated compounds, divinyl esters of polycarboxylic acids, diallyl esters of polyearboxylic acids, diallyl dimethyl ammonium chloride, triallyl terephthalate, methylene bis acrylamide, diallyl maleate, diallyl fumarate, hexamethylene bis maleamide, triallyl phosphate, trivinyl trimellitate, divinyl adipate, glyceryl trimethacrylate, diallyl succinate, divinyl ether, the divinyl ethers of ethylene glycol or diethylene glycol diacrylate, polyethylene glycol diacrylates or methacrylates, 1,6-hexanediol diacrylate, pentaerythritol triacrylate or tetraacrylate, neopentyl glycol diacrylate, allyl methacrylate, cyclopentadiene diacrylate, the butylene glycol diacrylates or dimethacrylates, trimethylolpropane di- or tri-acrylates, (meth)acrylamide, n-methylol (meth) acrylamide, mixtures thereof, and the like. (Meth) acrylamide, n-methylol (meth)acrylamide, and mixtures thereof are preferred. The amount of cross-linker utilized is chosen such that the cross-linker does not interfere with film formation.

Chain transfer agents may be used to control the molecular weight of the polymer used in this invention. Suitable chain transfer agents include mercaptans, such as, for example, dodecylmercaptan ("n-DDM"). The chain transfer agent may be used at from 0.1% to 10% based on the total weight of the polymeric composition.

The composition of this invention is typically prepared by admixing from 80 to 99.5 parts by weight calcium sulfate; from 0.5 to 20 parts by weight, preferably from 1 to 15 parts by weight, more preferably from 3 to 10 parts by weight of a polymer including as polymerized units: a) from 1 to 100 parts by weight of at least one $C_{12}$ to $C_{40}$ alkyl ester of (meth)acrylic acid, b) from 0 to 99 parts by weight of at least one ethylenically unsaturated monomer, and c) from 0 to 15 parts by weight of at least one ethylenically unsaturated acid containing monomer or salts thereof and water.

Enough water is added to the composition so that the admixture can be stirred and poured. Typically, from 30% to 50% water based on the weight of the gypsum powder is used. Preferably, from 35% to 45% water based on the weight of the gypsum powder is used.

The composition may contain defoaming agents such as dispersions of silicone compounds. Typically, the defoaming agent is used at from 0.1% to 1% by weight, based on the total weight of the composition.

It is preferred that the polymer used in the composition of this invention contains as polymerized units: a) from 20 to 95 parts by weight of at least one $C_{12}$ to $C_{40}$ alkyl ester of (meth)acrylic acid, b) from 4 to 79 parts by weight of at least one ethylenically unsaturated monomer, and c) from 1 to 10 parts by weight of at least one ethylenically unsaturated acid containing monomer or salts thereof. In a more preferred embodiment, the polymer contains as polymerized units: a) from 40 to 95 parts by weight of at least one $C_{12}$ to $C_{40}$ alkyl ester of (meth)acrylic acid, b) from 4 to 59 parts by weight of at least one ethylenically unsaturated monomer, and c) from 1 to 5 parts by weight of at least one ethylenically unsaturated acid containing monomer or salts thereof.

The admixture is then molded into a shape and dried. Typically, the shape is a flat board. Drying can be accomplished passively by exposure to air. Alternatively, the admixture may be heated at temperatures ranging from 50° C. to 150° C. to speed up drying. The heat may be radiant heat, forced hot air, or an oven.

The process of the invention provides a method of protecting gypsum wallboard including: 1) admixing from 0.5 to 20 parts by weight, preferably 1 to 15 parts by weight, more preferably 3 to 10 parts by weight of a polymer with from 80 to 99.5 parts by weight calcium sulfate and water; molding the admixture to form a gypsum wallboard; and 3) drying the gypsum wallboard;

wherein the polymer includes as polymerized units: a) from 1 to 100 parts by weight of at least one $C_{12}$ to $C_{40}$ alkyl ester of (meth)acrylic acid, b) from 0 to 99 parts by weight of at least one ethylenically unsaturated monomer, and c) from 0 to 15 parts by weight of at least one ethylenically unsaturated acid containing monomer or salts thereof.

It is preferred that the polymer used in the process of this invention contains as polymerized units: a) from 20 to 95 parts by weight of at least one $C_{12}$ to $C_{40}$ alkyl ester of (meth)acrylic acid, b) from 4 to 79 parts by weight of at least one ethylenically unsaturated monomer, and c) from 1 to 10 parts by weight of at least one ethylenically unsaturated acid containing monomer or salts thereof. In a more preferred embodiment, the polymer contains as polymerized units: a) from 40 to 95 parts by weight of at least one $C_{12}$ to $C_{40}$ alkyl ester of (meth)acrylic acid, b) from 4 to 59 parts by weight of at least one ethylenically unsaturated monomer, and c) from 1 to 5 parts by weight of at least one ethylenically unsaturated acid containing monomer or salts thereof.

The gypsum contains mostly calcium sulfate, which is commercially available. The gypsum wallboard may be dried as described above.

The polymer in the composition of this invention and the process of this invention may also be admixed with latexes prior to admixing with the calcium sulfate and water. Any latex may be used. Suitable latexes include, but are not limited to butyl acrylate/methyl methacrylate, butyl acrylate/styrene, styrene/butadiene, and vinyl acetate latexes. The amount of polymer admixed with the latex is typically from 1 to 50 parts by weight, preferably 5 to 45 parts by weight, more preferably 10 to 40 parts by weight. The admixture is typically admixed with calcium sulfate and water as described above.

The following abbreviations are used throughout this patent application:

| | |
|---|---|
| SMA = stearyl methacrylate | MMA = methyl methacrylate |
| MAA = methacrylic acid | CD = methyl-β-cyclodextrin |
| LMA = lauryl methacrylate | |

The following Examples are intended to demonstrate the compositions and the method of this invention and the benefits obtained in gypsum wallboard. The Examples should not be construed as limiting the scope of the invention.

The general procedure for preparing the polymers used in this invention was as follows: for stage 1, 400 g deionized water, Triton® XN-45S (Trademark of Union Carbide Chemical Company) anionic surfactant, and 28.6 g CD were introduced into a 4-liter round bottom flask with four necks equipped with a machanical stirrer, temperature control device, condenser, monomer and initiator feed lines, and a nitrogen inlet at room temperature. The contents were heated to 85° C. while stirred under a nitrogen purge. A monomer emulsion was prepared separately. Solutions of 0.35% by weight sodium carbonate (based on the total monomer weight in stage 1 and stage 2) in 25 g deionized water and 0.35% by weight sodium persulfate (based on the total monomer weight in stage 1 stage 2) in 30 g deionized water were introduced into the reaction kettle. The monomer emulsion was fed over a period of 20 minutes together with an initiator solution of 0.05% sodium persulfate (based on the total monomer weight in stage 1 and stage 2) in 210 g deionized water.

For stage 2, a second monomer emulsion was prepared using 625 g deionized water, 7.8 g Triton® XN-45S anionic surfactant, and monomers. Immediately after the end of the stage 1 monomer emulsion feed, the stage 2 monomer emulsion was fed over a period of 3 hours together with the sodium persulfate initiator solution. The monomers of the first and second monomer emulsions were selected such that the polymers of Table 1 (based on weight percent monomer) were obtained. The list of different polymers includes polymers with and without n-DDM. The use of n-DDM lowers the molecular weight of the polymer (from about 500,000 to about 150,000).

TABLE 1

| Polymer | LMA | SMA | MMA | MAA | Zonyl |
|---|---|---|---|---|---|
| 1 | 0 | 93 | 5 | 2 | 0 |
| 2 | 23 | 70 | 5 | 2 | 0 |
| 3* | 23 | 70 | 5 | 2 | 0 |
| 4 | 47 | 46 | 5 | 2 | 0 |
| 5* | 47 | 46 | 5 | 2 | 0 |
| 6 | 68 | 25 | 5 | 2 | 0 |
| 7 | 68 | 25 | 5 | 2 | 0 |
| 8 | 0 | 83 | 6 | 1 | 10 |

*= contains 0.5% by weight, based on the weight of the gypsum powder Lipocol L-23 (commercially available through Lipo Chemical Inc.)
Zonyl is a Trademark of DuPont Chemical Company Laboratory Gypsum Board Preparation An aliquot of polymer 1 (4.95 grams) was measured into a plastic container and diluted with 33.94 grams of water. The diluted solution (about 4% solid) was blended with 1.1 grams of 10% solid dispersant, Tamol®-L(sodium salt of sulfonated naphthalene-formaldehyde condensate from Rohm and Haas Company). The solution was gradually mixed into 50 grams of dry gypsum powder. The admixture was vigorously mixed into a paste by hand with a spatula. Within 3 minutes, the gypsum paste was poured into a polypropylene mold (2.54 cm×2.54 cm×2.54 cm) to be set. The set sample cubes were then either dried at room temperature or dried in an oven at 160° C. for 18 minutes. The samples were then cooled and ready for testing.

The procedure above was repeated with different amounts of polymer added, such that samples were prepared with 3%, 5%, and 10% polymer add on based on the total weight of the sample. A control sample (no polymer added) was also prepared as described above.

Water Soak Test

The sample cubes were immersed into a bath of water at a constant temperature of 21° C. with a head of 2.54 cm of water over the top of the samples. The weight of the samples was measured in minute intervals for up to 2 hours. The results of the test are shown in Table 2.

TABLE 2

| | | Polymer 1 - Water Absorption (%) | | |
|---|---|---|---|---|
| Time (min.) | Control | 3% Add On | 5% Add On | 10% Add On |
| 0 | 0 | 0 | 0 | 0 |
| 1 | 42 | 2 | 1 | 2 |
| 5 | 49 | 6 | 3 | 2 |
| 10 | 48 | 8 | 4 | 2 |
| 30 | 49 | 13 | 7 | 3 |
| 60 | 47 | 20 | 10 | 4 |
| 120 | 47 | 25 | 13 | 6 |

The data above indicates that the gypsum wallboard prepared according to this invention has excellent water resistance.

Water Dispersing Test

Gypsum wallboard samples were prepared as described above. A drop of water (about 0.04 grams) was dropped through a plastic pipet onto the sample surface and then the length of time it took for the water to disappear from the surface was measured by seconds and minutes. The longer the time, the better the water repellence of the samples. The results of this test are shown in Table 3.

TABLE 3

| Polymer | % Add On | Time To Disappear |
|---|---|---|
| 1 | 1 | 5 minutes |
| 1 | 3 | 22 minutes |
| 2 | 3 | 6 minutes |
| 3 | 3 | 10 minutes |
| 4 | 3 | 5 minutes |
| 5 | 3 | 7 minutes |
| 6 | 3 | 4 minutes |
| 7 | 3 | 10 minutes |
| 8 | 1 | 25 seconds |
| 8 | 3 | 3 minutes |
| Control (no polymer) | 0 | 0 seconds |

The data above further demonstrates that the gypsum wallboard prepared according to this invention has excellent water resistance.

Compression Strength

The above described cubic samples were crushed with a Tinus Olsen Tester with 0.26 cm per minute cross head speed and digital reading of the compression strength of pounds per square inch, which was converted to Newtons per square meter ($N/m^2$). The results are shown in Table 4.

TABLE 4

| Polymer | % Add On | Strength ($N/m^2$) |
|---|---|---|
| 8 | 1 | 0.13 |
| 8 | 3 | 0.15 |
| 1 | 1 | 0.13 |
| 1 | 3 | 0.12 |
| Control | 0 | 0.14 |

The data above indicates that the polymers utilized in this invention do not weaken gypsum wallboard.

What is claimed:

1. A composition comprising:
   from 80 to 99.5 parts by weight calcium sulfate; and
   from 0.5 to 20 parts by weight of a polymer including as polymerized units: a) from 20 to 95 parts by weight of at least one $C_{12}$ to $C_{40}$ alkyl ester of (meth)acrylic acid, b) from 4 to 79 parts by weight of at least one ethylenically unsaturated monomer, and c) from 1 to 10 parts by weight of at least one ethylenically unsaturated acid containing monomer or salts thereof.

2. The composition according to claim 1 wherein the polymer is present at from 1 to 15 parts by weight and comprises as polymerized units: a) from 20 to 95 parts by weight of at least one $C_{12}$ to $C_{40}$ alkyl ester of (meth)acrylic acid, b) from 4 to 79 parts by weight of at least one ethylenically unsaturated monomer, and c) from 1 to 10 parts by weight of at least one ethylenically unsaturated acid containing monomer or salts thereof.

3. The composition according to claim 1 wherein the polymer is present at from 3 to 10 parts by weight and comprises as polymerized units: a) from 40 to 95 parts by weight of at least one $C_{12}$ to $C_{40}$ alkyl ester of (meth)acrylic acid, b) from 4 to 59 parts by weight of at least one ethylenically unsaturated monomer, and c) from 1 to 5 parts by weight of at least one ethylenically unsaturated acid containing monomer or salts thereof.

4. A method of protecting gypsum wallboard comprising:
   1) admixing from 0.5 to 20 parts by weight of a polymer with from 80 to 99.5 parts by weight calcium sulfate and water;
   2) molding the admixture to form a gypsum wallboard; and
   3) drying the gypsum wallboard;
   wherein the polymer includes as polymerized units: a) from 20 to 95 parts by weight of at least one $C_{12}$ to $C_{40}$ alkyl ester of (meth)acrylic acid, b) from 4 to 79 parts by weight of at least one ethylenically unsaturated monomer, and c) from 1 to 10 parts by weight of at least one ethylenically unsaturated acid containing monomer or salts thereof.

5. The method according to claim 4 wherein the polymer is present at from 1 to 15 parts by weight and comprises as polymerized units: a) from 20 to 95 parts by weight of at least one $C_{12}$ to $C_{40}$ alkyl ester of (meth)acrylic acid, b) from 4 to 79 parts by weight of at least one ethylenically unsaturated monomer, and c) from 1 to 10 parts by weight of at least one ethylenically unsaturated acid containing monomer or salts thereof.

6. The method according to claim 4 wherein the polymer is present at from 3 to 10 parts by weight and comprises as polymerized units: a) from 40 to 95 parts by weight of at least one $C_{12}$ to $C_{40}$ alkyl ester of (meth)acrylic acid, b) from 4 to 59 parts by weight of at least one ethylenically unsaturated monomer, and c) from 1 to 5 parts by weight of at least one ethylenically unsaturated acid containing monomer or salts thereof.

7. The composition according to claim 1 wherein the at least one ethylenically unsaturated monomer is selected from the group consisting of methyl acrylate, ethyl acrylate, butyl acrylate, 2-ethylhexyl acrylate, decyl acrylate, methyl methacrylate, butyl methacrylate, hydroxyethyl methacrylate, hydroxypropyl acrylate, acrylamide, styrene, vinyl acetate, vinyl chloride, vinylidene chloride, N-vinyl pyrrolidone, acrylonitrile, and methacrylonitrile.

8. The composition according to claim 7 wherein the at least one ethylenically unsaturated monomer is selected from the group consisting of butyl acrylate, methyl methacrylate, and styrene.

9. The composition according to claim 1 wherein the at least one $C_{12}$ to $C_{40}$ alkyl ester of (meth)acrylic acid is selected from the group consisting of lauryl (meth)acrylate, cetyl (meth)acrylate, stearyl (meth)acrylate, behenyl (meth)acrylate, and eicosyl (meth)acrylate.

10. The composition according to claim 1 wherein the ethylenically unsaturated acid containing monomer is selected from the group consisting of acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride.

11. The method according to claim 4 wherein the at least one ethylenically unsaturated monomer is selected from the group consisting of methyl acrylate, ethyl acrylate, butyl acrylate, 2-ethylhexyl acrylate, decyl acrylate, methyl methacrylate, butyl methacrylate, hydroxyethyl methacrylate, hydroxypropyl acrylate, acrylamide, styrene, vinyl acetate, vinyl chloride, vinylidene chloride, N-vinyl pyrrolidone, acrylonitrile, and methacrylonitrile.

12. The method according to claim 11 wherein the at least one ethylenically unsaturated monomer is selected from the group consisting of butyl acrylate, methyl methacrylate, and styrene.

13. The method according to claim 4 wherein the at least one $C_{12}$ to $C_{40}$ alkyl ester of (meth)acrylic acid is selected from the group consisting of lauryl (meth)acrylate, cetyl (meth)acrylate, stearyl (meth)acrylate, behenyl (meth)acrylate, and eicosyl (meth)acrylate.

14. The method according to claim 4 wherein the ethylenically unsaturated acid containing monomer is selected from the group consisting of acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride.

* * * * *